April 7, 1959 F. RIZZATTI ET AL 2,880,490
QUICK MOUNTING MEANS FOR PHOTOGRAPHIC CAMERAS
Filed Jan. 20, 1956 2 Sheets-Sheet 2

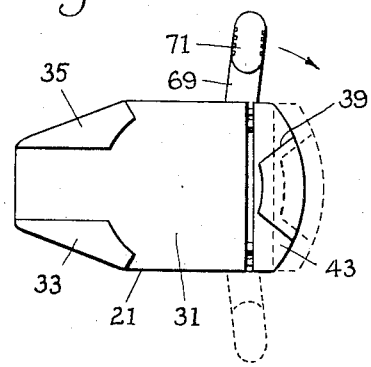
Fig.1
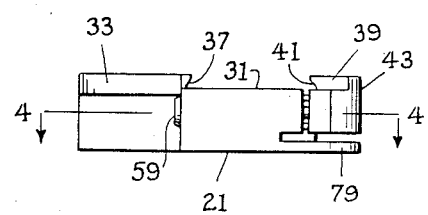
Fig.2
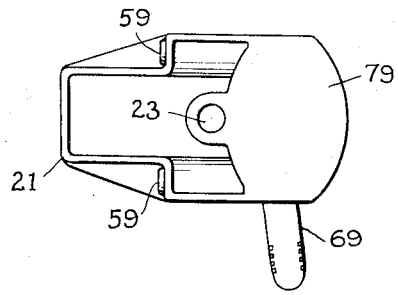
Fig.3
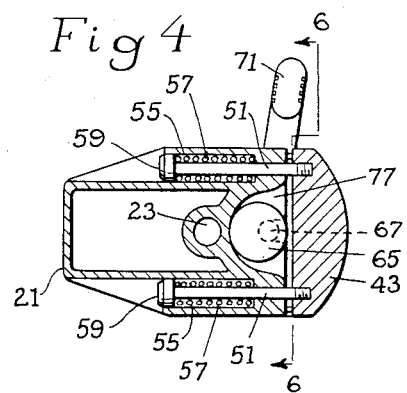
Fig 4
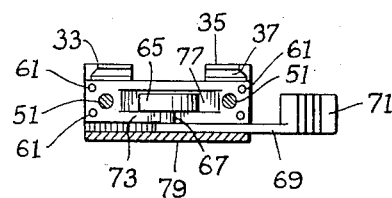
Fig.6
Fig.5

United States Patent Office 2,880,490
Patented Apr. 7, 1959

2,880,490

QUICK MOUNTING MEANS FOR PHOTOGRAPHIC CAMERAS

Frank Rizzatti, Valley Stream, N.Y., and Jack D. Callahan, Leonia, N.J., assignors to Burleigh Brooks Inc., New York, N.Y., a corporation of New York Application January 20, 1956, Serial No. 560,414

3 Claims. (Cl. 24—263)

This invention relates to the mounting of a photographic camera on a tripod, unipod, or other suitable support.

An object of the invention is the provision of generally improved and more satisfactory mounting means for mounting a camera on or demounting it from a support with extreme rapidity and ease.

Another object is the provision of simple and inexpensive mounting means in the form of a clamping device which can be initially mounted on a tripod, unipod, or other desired support, and left in place thereon permanently, after which the camera may be easily and quickly attached to or detached from the clamping device in much less time than is required for the conventional screw threaded mounting.

A further object is the provision of a camera mounting accessory of such compact size and light weight that it may easily be carried (e.g., in the pocket of the operator) so as to be available for attachment to any tripod head which the operator may intend to use.

A still further object is the provision of an attaching device or clamping device of extreme simplicity, which has no close tolerances and may be made very inexpensively, and which may be used with any camera provided with the usual standard screw threaded socket for receiving the tripod screw, as well as with certain types of cameras for which the invention is particularly adapted.

These and other desirable objects may be attained in the manner disclosed as an illustrative embodiment of the invention in the following description and in the accompanying drawings forming a part hereof, in which:

Fig. 1 is a top plan view of the clamp of the present invention, in closed position;

Fig. 2 is a side elevation thereof;

Fig. 3 is a bottom plan view of the clamp in closed position;

Fig. 4 is a horizontal section taken substantially on the line 4—4 of Fig. 2, with the clamp closed;

Fig. 5 is a similar view with the clamp open;

Fig. 6 is a vertical section taken substantially on the line 6—6 of Fig. 4;

The same reference numerals throughout the several views indicate the same parts.

Figure 7:
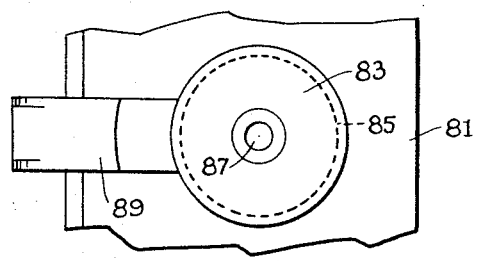
Fig. 7 is a fragmentary bottom view of one form of camera for which the clamp of the present invention is especially intended.

In most of the modern cameras on the market, there is provided in the bottom wall of the camera a fitting or fixture sometimes called a tripod mount or tripod socket, comprising a small opening or bore screw threaded to receive the standard screw threaded stud which rises from the head of a tripod, or other equivalent stud such as found on a unipod or on certain special forms of camera mounts, as for example those which include a ball and socket joint, the screw threaded mounting stud being on the upper member of such joint. The conventional mounting or demounting of the camera requires several turns of the threaded stud, taking considerable time, especially when the stud is in crowded or cramped quarters.

Referring now to the drawings, and especially to Figs. 1-6, the clamping device of the present invention comprises a main body 21 conveniently formed of die cast metal, having approximately centrally thereof a vertical bore 23 open at its bottom and closed at its top, and internally screw threaded to receive the usual standard size of threaded stud which is found on a photographic camera tripod or other similar camera supports such as a unipod, a ball and socket camera mount, etc. By means of this threaded bore or socket 23, the clamping device may be mounted on the tripod, unipod, or other conventional camera support, and will remain in fixed position thereon as long as desired.

The top surface of the clamp device has a central flat portion 31, having two fixed jaws 33 and 35 rising slightly therefrom at the right and left forward corners of the clamping device. (The forward end of the clamping device is the end which appears at the left in Figs. 1–5, so that the jaw operating handle will swing around the rear end of the device.) These fixed jaws 33 and 35 are preferably die cast or molded integrally with the body 21, and are slightly dovetailed or beveled or undercut along arcuate edges which face toward the central portion of the device, as seen at 37.

A third clamping jaw 39 is mounted for movement relative to the fixed jaws 33 and 35. This jaw 39 is similarly formed with an undercut or dovetailed edge 41 which is similarly faced toward the center of the clamping device, and is formed integrally with a block member 43 which moves toward and away from the main stationary body 21, in a horizontal plane. Conveniently, a pair of headed studs 51 (see especially Figs. 4 and 5) arranged with their axes parallel to each other and on opposite sides of the longitudinal center line of the device, are screwed at their rear ends into the block 43 and extend in snug sliding relation through small bores in the stationary body 21. These bores are counterbored at 55 at their forward ends. Coiled compression springs 57 in the counterbores 55 press rearwardly against the fixed body 21 and forwardly against the heads 59 of the studs 51, thus tending constantly to pull the block 43 toward the rear end of the main body 21, to close the third jaw 39 toward the first two or stationary jaws 33 and 35. Even in the fully closed position, however, there is a slight gap between the blocks 43 and the body 21, due to spacing pins or protuberances 61 projecting slightly from the rear face of the main body 21, so as to minimize the danger of the operator accidentally pinching part of his finger between the block 43 and the main body 21, when the jaw 39 is closed toward the jaws 33 and 35.

For opening the jaws against the force of the springs 57, there is provided a cam 65 in the form of a circular disk cast or formed eccentrically on a short shaft 67 secured to and preferably cast integrally with a radially extending operating arm 69 provided with an enlarged finger piece 71. The main body 21 is formed at its rear end with a horizontal flange 73 having a vertical thickness just a trifle less than the vertical spacing between the top of the operating arm 69 and the bottom of the cam disk 65. This flange 73 is provided with a notch 75 (see Fig. 5) open at its rear, in which notch the shaft 67 is seated. Above this notched flange 73, the main body 21 is cut away or recessed as indicated at 77, sufficiently to allow space for the cam disk 65 to turn freely. A horizontal flange 79, formed integrally as part of the main body 21, underlies a portion of the length of the lever 69 and also underlies the block 43 when the latter is in the forward or closed position.

The forward pressure of the block 43 against the circumference or periphery of the cam disk 65, as caused by the springs 57, constantly tends to press the cam disk forwardly and thus keeps its short shaft 67 seated in the bottom of the notch 75 which forms a journal or bearing for the shaft. When the operating lever 69 and finger piece 71 are in the position shown in full lines in Figs. 1 and 4, the eccentricity of the cam is in such direction with relation to the movable block 43 that it does not interfere with the forward movement of the block, and the springs 57 are able to pull the block to its maximum forward position. As the lever 69 and finger piece 71 are swung clockwise when viewed from above, to the dotted line position shown in Fig. 1 and full line position shown in Fig. 5, the eccentric cam disk 65 moves the block 43 rearwardly against the force of the springs 57, to open up the rear clamping jaw 39 away from the two forward clamping jaws 33 and 35.

In certain kinds of cameras, such as the well known cameras identified by the trademarks "Rolleiflex" and "Rolleicord," manufactured by the firm of Franke & Heidecke, in Braunschweig, Germany, and widely sold throughout the United States and elsewhere, the bottom of the camera body is equipped with a tripod mount member in the form of a circular piece which projects slightly downwardly from the horizontal bottom wall of the camera body, and which is undercut or grooved all the way around its circular periphery, as well as being centrally apertured and threaded for receiving a threaded mounting stud. For example, the bottom of cameras of this kind, as viewed from below, appear substantially as seen in Fig. 7, where the camera body is fragmentarily indicated in general at 81, being provided with the circular projection 83 undercut at 85 and having the central threaded aperture 87 for receiving a threaded stud to mount the camera on a tripod or the like, in the prior practice.

Since there are many cameras of this kind already in use, in which the circular projection 83 and its undercut groove 85 are all of the same standard dimensions, the clamping device of the present invention is preferably made of a size to fit such cameras, and is especially adapted for use with such cameras. The arcuate faces of the three jaws 33, 35, and 39, have the same radius as the circular projection 83 on the camera body mentioned, and the dimensions of the clamping device as a whole are such that when the movable clamping jaw 39 is moved to its maximum open position, the circular member 83 may be inserted easily between the opened jaws to rest on the central flat surface 31 of the clamping device, and when the handle 71 is then swung to close the jaws, the rear jaw 39 will clamp tightly against and interengage with the beveled portion or undercut rim or groove 85 in the circular member 83 on the camera body and will hold it, in turn, firmly engaged and interlocked with the fixed jaws 33 and 35. The type of camera above mentioned also has a member 89 which projects downwardly from the bottom wall of the camera and forwardly from the circular member 83 and constitutes part of the mechanism for latching the camera back in closed position. It will be noted especially from Figs. 1 and 6 that the fixed jaws 33 and 35 in the present construction are spaced laterally from each other, leaving a space 91 between them, which space is of sufficient dimensions to receive the projecting part 89 on the camera body of the kind above mentioned.

In using the device of the present invention, the device is first attached to the tripod or other support by means of the usual threaded stud 95 on the tripod head 97, screwed into the threaded bore 23 of the clamping device. The clamping device remains in this position on the tripod head so long as it is desired to use it with this particular tripod, although obviously it may be unscrewed from the tripod head and placed on any other tripod or other suitable support, whenever desired. It is not appreciably larger than the usual tripod head, so does not interfere with handling the tripod.

When the operator wishes to use a camera of the above mentioned type on the tripod to which this clamping device has been attached, he simply swings the operating handle 71 to the position shown in Fig. 5, to open up the rear jaw 39. Then he places the camera in the usual upright position on top of the clamping device, shoving the circular projection 83 forwardly so as to engage and interlock the groove 85 on the camera with the overhanging edges of the jaws 33 and 35, the camera part 89 meanwhile extending straight forwardly through the gap 91 between the jaws 33 and 35. The handle 71 is then swung back to the initial position shown in Fig. 4 and in full lines in Fig. 1, so that the pressure of the cam 65 against the block 43 is released, and the springs 57 are free to pull the block 43 forwardly, clamping the rear jaw 39 tightly against the rear edge of the circular projection 83 and interlocking the overhanging part of the rear jaw with the groove 85. The camera is now set rigidly on the clamping device, which in turn has previously been secured to the tripod.

To remove the camera, the handle 71 is simply swung through approximately half a revolution, opening up the clamping jaws, whereupon the camera may immediately be lifted off. It is seen that this operation is far faster both in mounting the camera and in demounting the camera, than the previous conventional method of using a threaded stud which has to be turned through several turns or revolutions.

Figure 9:
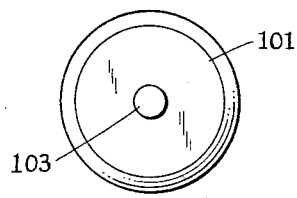
Fig. 9 is a bottom plan view of an adapter accompanying the clamp, for use in mounting any other type of camera different from the one shown in Figs. 7 and 8.
Figure 8:
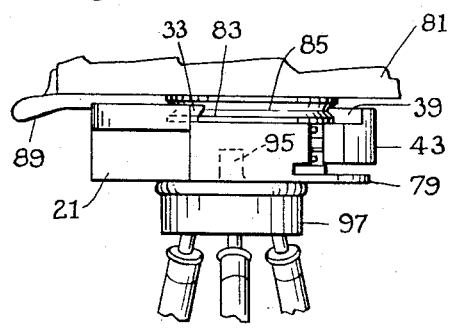
Fig. 8 is a fragmentary side view of such camera mounted in place on the clamp of the present invention, the clamp in turn being mounted on a conventional tripod.
Figure 10:
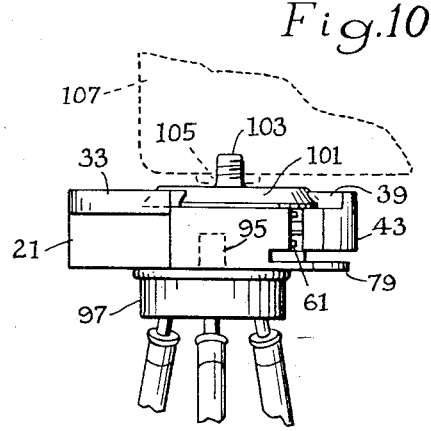
Fig. 10 is a fragmentary side elevation of a different form of camera mounted on the clamp with the use of the adapter shown in Fig. 9, the clamp in turn being mounted on a tripod.

To enable the clamping device of the present invention to be used also with other cameras not equipped with a circular grooved member like the member 83 above described, the device is also provided with an adapter comprising a frusto-conical plate 101 (Figs. 9 and 10) which may also be described as a circular plate with a beveled edge, having the same diameter as the circular member 83 which is a standard part of the particular cameras above mentioned. This member 101 is provided centrally with an upwardly projecting threaded stud 103 of the standard tripod mount size, which may be screwed into the standard threaded socket 105 customarily provided on any modern camera such as indicated fragmentarily at 107. The adapter 101, 103 is intended to be sold as a unit with the clamping device, and can conveniently be attached thereto (during initial sale) by screwing the stud 103 of the adapter into the threaded bore 23 of the clamping device, since the screw threads of these parts are the same.

Figure 11:
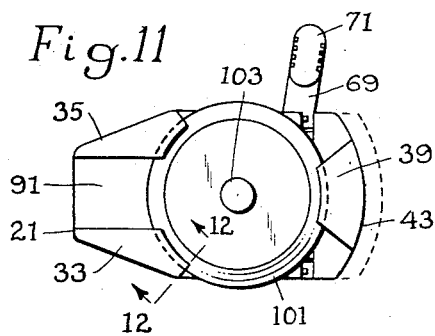
Fig. 11 is a top plan view of the adapter clamped in position on the clamping mechanism, but with the camera itself removed from the adapter.
Figure 12:
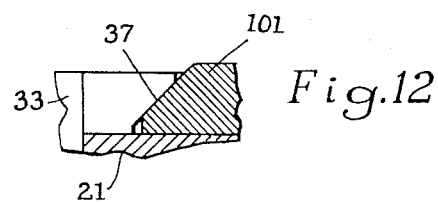
Fig. 12 is a fragmentary vertical section taken substantially on the line 12—12 of Fig. 11.

Thus if the purchaser has a camera of different type, not equipped with the undercut circular disk 83, he simply screws the adapter 101, 103 into the threaded tripod socket of his camera, and leaves it there. After that, his camera is used in exactly the same way as the particular camera above identified, the camera being mounted on the clamping device (which has previously been mounted on the tripod) by opening the jaws of the clamping device, placing the camera so that the adapter 101 thereon lies flat on the surface 31 of the clamping device, and then closing the jaws of the clamping device so as to engage and interlock with the edges of the adapter 101 as well seen in Figs. 10, 11, and 12.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An adapter for quickly mounting a photographic camera on and removing it from a tripod or the like, comprising a body having two spaced arcuate clamping jaws secured to one face thereof, a block having a third arcuate clamping jaw thereon, means mounting said block on said body for movement of said third clamping jaw toward and away from said two clamping jaws, said jaws having undercut edges adapted to engage the inclined edges of a circular mounting member carried by the bottom wall of the camera, said mounting means including resilient means urging said third clamping jaw toward said two clamping jaws for releasably holding the mounting member, a cylindrical cam member rotatably mounted on said body and having its edge continuously in contact with said block, handle means operatively connected to said cam member for rotating said cam member to move said third clamping jaw away from said two clamping jaws to release the camera mounting member, and means providing a threaded bore in said body and adapted to receive a threaded stud carried by the tripod.

2. An adapter for quickly mounting a photographic camera on and removing it from a tripod or the like, comprising a body having two spaced clamping jaws secured to one face thereof, a block having a third clamping jaw thereon, means mounting said block on said body for movement of said third clamping jaw toward and away from said two clamping jaws, said jaws having undercut arcuate edges adapted to engage the inclined edges of a circular mounting member carried by the bottom wall of the camera, said mounting means including springs continuously urging said third clamping jaw toward said two spaced clamping jaws for releasably holding the mounting member, a shaft mounted on said body, a circular cam member fixed eccentrically to one end of said shaft and having its edge continuously in contact with said block, handle means secured to the other end of said shaft for rotating said cam member to move said third clamping jaw away from said two spaced clamping jaws to release the camera mounting member, and means providing a threaded bore in said body and adapted to receive a threaded stud carried by the tripod.

3. An adapter for quickly mounting a photographic camera on and removing it from a tripod or the like, comprising a body having two spaced clamping jaws secured to one face thereof, a block having a third clamping jaw thereon, means mounting said block on said body for movement of said third clamping jaw toward and away from said two clamping jaws along a line bisecting said two clamping jaws, said jaws having undercut arcuate edges adapted to engage the inclined edges of a circular mounting member carried by the bottom wall of the camera, said mounting means including springs continuously urging said third clamping jaw toward said two spaced clamping jaws for releasably holding the mounting member, a disk providing a cam member having its edge continuously in contact with said block, a shaft having one end secured eccentrically to said disk, a handle secured to the other end of said shaft, said body including a flange lying between said disk and handle and having in one edge a notch which receives and forms a bearing for said shaft, said handle being adapted to be rotated manually to thereby rotate said disk and move said third clamping jaw away from said two clamping jaws to release the camera mounting member, and means providing a threaded bore in said body and adapted to receive a threaded stud carried by the tripod.

References Cited in the file of this patent

UNITED STATES PATENTS

| 534,912 | Perry | Feb. 26, 1895 |
| 1,553,441 | Grunwald | Sept. 15, 1925 |
| 1,824,344 | Goldberg | Sept. 23, 1931 |
| 2,029,230 | Getz | Jan. 28, 1936 |
| 2,324,184 | Wyman | July 13, 1943 |
| 2,615,664 | Reeves | Oct. 28, 1952 |
| 2,720,372 | Gowan | Oct. 11, 1955 |

FOREIGN PATENTS

| 73,291 | Denmark | Oct. 29, 1951 |